May 17, 1960 E. F. FISHER 2,937,013
WATER COOLED DEFLECTORS USED IN FLY ASH
SUPPRESSION SYSTEMS
Filed April 20, 1956 2 Sheets-Sheet 1

INVENTOR.
Ernest F. Fisher

May 17, 1960     E. F. FISHER     2,937,013
WATER COOLED DEFLECTORS USED IN FLY ASH
SUPPRESSION SYSTEMS
Filed April 20, 1956     2 Sheets-Sheet 2

INVENTOR.
Ernest F. Fisher

United States Patent Office 2,937,013
Patented May 17, 1960

2,937,013

WATER COOLED DEFLECTORS USED IN FLY ASH SUPPRESSION SYSTEMS

Ernest F. Fisher, York, Pa.

Application April 20, 1956, Serial No. 579,638

2 Claims. (Cl. 261—17)

This invention relates to water cooled deflectors used in fly ash suppressor systems.

One application of this new and improved deflector is found in suppressing fly ash from a cupola melting furnace. Other applications of the invention will be understood from the description.

One object of the invention is to provide an efficient and simple method of flushing the deflector surface with water so that the entire surface is covered with a copious blanket of water and that this water will flow off the edge of the deflector in a continuous unbroken sheet through which the ash laden gases must travel.

Another object of the invention is to aerify the water and thereby increase its effective volume and wetting capacity.

Referring to the appended drawings.

Figure 2:
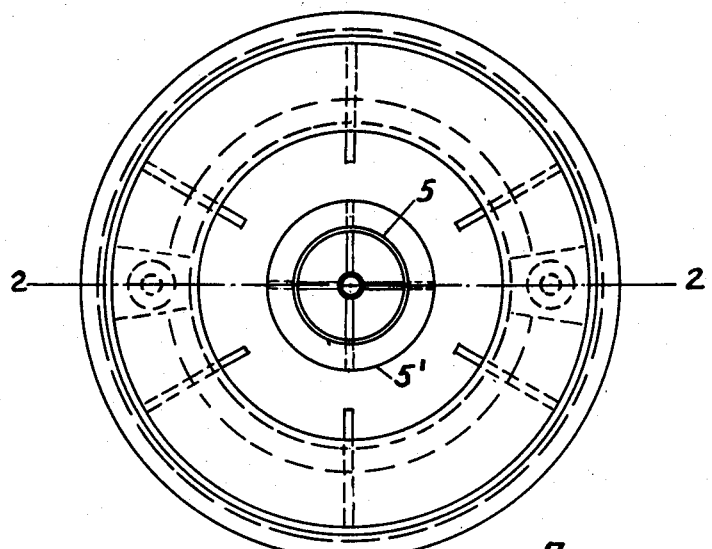
Figure 2 is a plan view of the deflector assembly and enclosing shell taken on line 1—1 of Figure 1.
Figure 1:
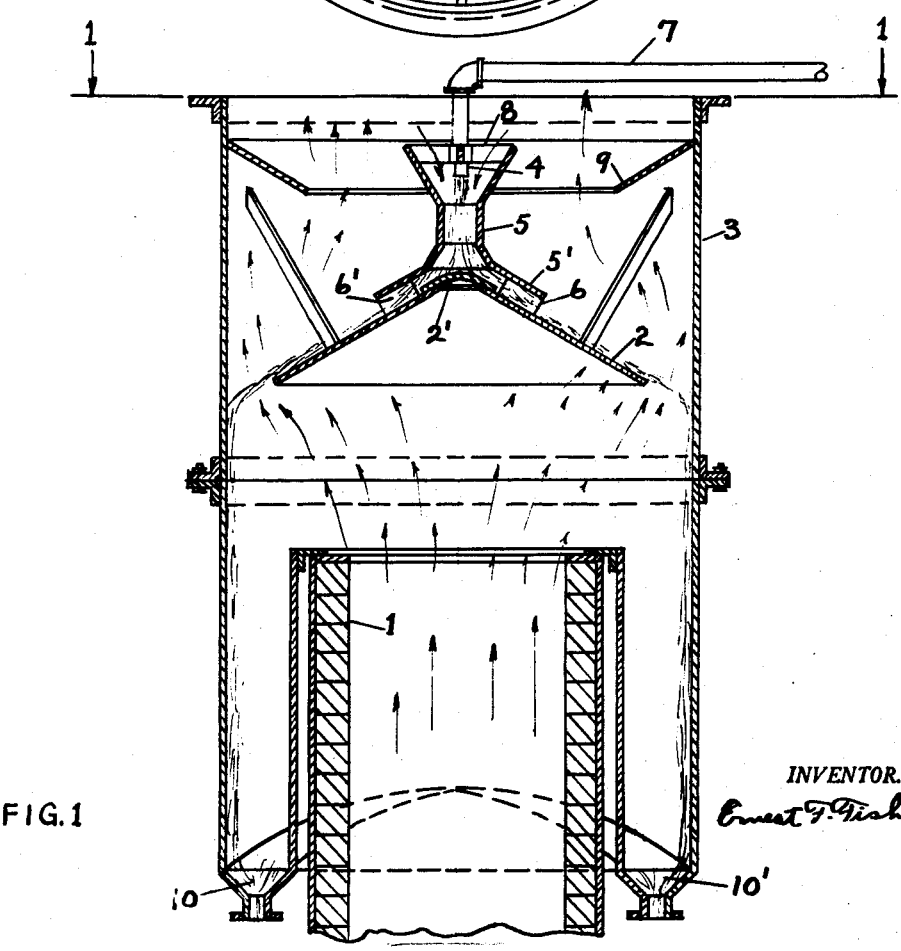
Figure 1 is a vertical sectional view of the deflector assembly taken on line 2—2 of Figure 2 as applied to a cupola melting furnace.
Figure 3:
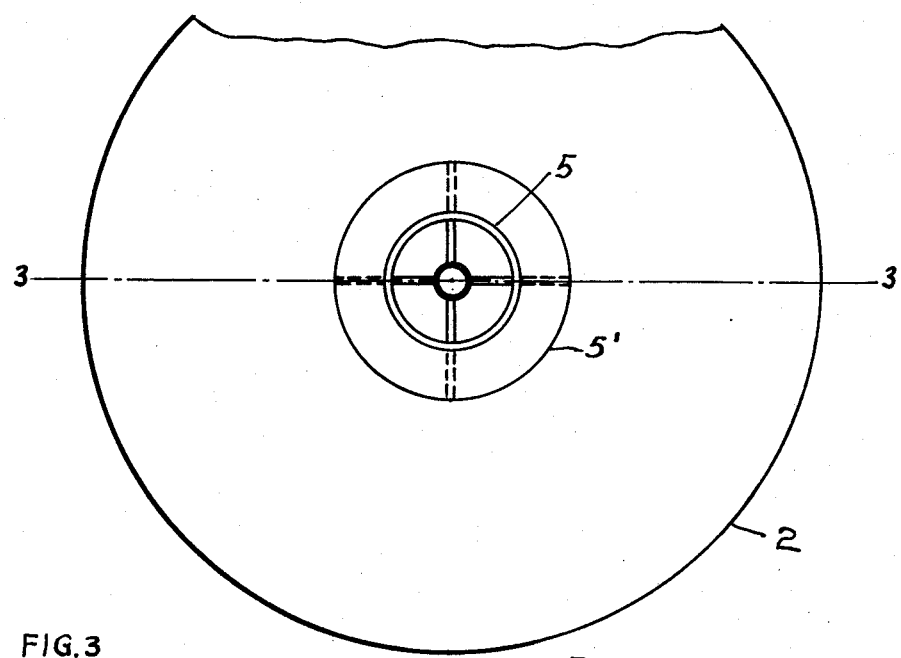
Figure 3 is an enlarged plan view of the deflector and venturi tube assembly taken on line 4—4 of Figure 4.
Figure 4:
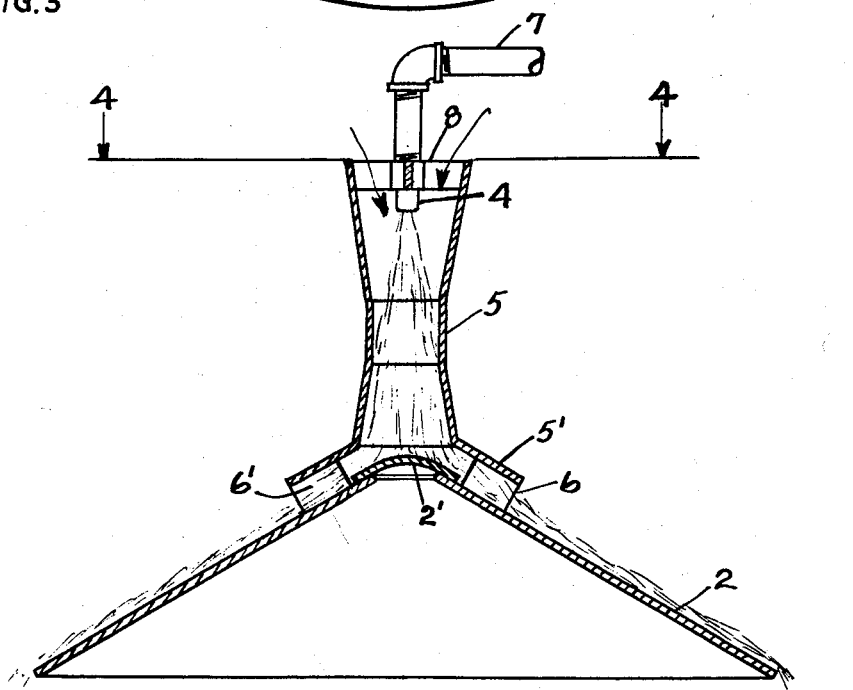
Figure 4 is an enlarged vertical sectional view of the deflector and venturi tube assembly taken on line 3—3 of Figure 3.

Figure 1 shows a cupola furnace stack 1 over which is suspended the conical deflector 2 which is enclosed in the circular shell 3. The conical deflector 2 has at its apex or truncated section a convex dished splash plate 2', which is welded to the apex of the truncated cone 2. Over the center of this splash plate is centered axially the water nozzle 4 which is positioned coaxially in the venturi tube 5 which in turn is centered axially over splash plate 2' and is separated from cone 2 at its lower flared end 5', by radial separating vanes 6 thus forming a circular opening 6' through which water flows uniformly onto cone 2.

In operation, water is supplied through pipe 7 to nozzle 4. As the stream of water under pressure from nozzle 4 flows through venturi tube 5, the water impinges on splash plate 2' and spreads out evenly because of the curved surfaces of the splash plate and fills the space under the flared lower end 5' of venturi tube 5. This flow of water induces a flow of air through opening 8 of venturi tube 5. This air and water mixture foams up and flows through opening 6' onto cone 2, completely filling the space under the flared lower end 5' of venturi tube 5, and issuing uniformly around the periphery of circular opening 6', thus keeping the surface of cone 2 cooled and copiously flooded so that a continuous sheet of water falls off the lower edge of cone 2.

The ash laden gases must pass through this continuous sheet of water in their passage upward through shell 3 and the baffle 9 to the atmosphere. In contact with this water sheet, the ash particles are wetted and precipitated down the wall of shell 3 into sumps 10 and 10', from whence the ash is drained away with the water.

It will of course be understood that in practice any suitable proportion, form or contour may be used for the deflector and splash plate without departing from the spirit of the invention.

Various other modifications will occur to those skilled in the art in the configuration and disposition of the component elements going to make up the invention as a whole, as well as in the selection of specific features and their combination to attain desired results dependent upon the use to which the invention is to be put, and no limitation is intended by the phraseology of the foregoing specification or illustrations in the accompanying drawings, except as indicated in the appended claims.

What is claimed is:

1. In a stack gas fly ash suppressor comprising an encasing shell having an opening in the bottom thereof adapted to be positioned over and on a stack so that the ash laden stack gases pass through the opening, a substantially conical fluid deflector supported centrally within and by said shell and forming an annular passageway between itself and the encasing shell, a venturi tube having flared upper and lower ends positioned within said shell above and coaxially with said deflector, the apex of said deflector forming a splash plate, the lower flared end of said venturi being positioned to surround said splash and being spaced from said splash plate to form an outlet, a water supply nozzle positioned within the upper end of said venturi, means to supply water to said nozzle whereby water flowing from the nozzle will induce a flow of air through said venturi and cause the stream of water and air to provide a copious volume of water-air mixture in the form of foam which will entirely fill the space between the deflector and said lower flared venturi end, said water-air mixture thereafter flowing evenly from said outlet and over said splash plate and deflector to fall from the lower circular edge of said deflector in a continuous unbroken sheet into the annular passageway through which the ash laden gases passing through the stack must travel.

2. In a stack gas fly ash suppressor as set forth in claim 1, wherein the apex portion of the deflector is formed to provide a splash plate which is upwardly convex in shape.

References Cited in the file of this patent

UNITED STATES PATENTS

| 809,383 | Lowe | Jan. 9, 1906 |
| 2,032,404 | Fisher | Mar. 3, 1936 |
| 2,147,876 | Baumann | Feb. 21, 1939 |
| 2,152,251 | Gay | Mar. 28, 1939 |
| 2,259,626 | Erikson | Oct. 21, 1941 |
| 2,387,345 | Pearl | Oct. 23, 1945 |
| 2,529,045 | Ortgies | Nov. 7, 1950 |

FOREIGN PATENTS

| 26,504 | Finland | Mar. 31, 1954 |